(12) United States Patent
Nakamura

(10) Patent No.: US 8,315,462 B2
(45) Date of Patent: Nov. 20, 2012

(54) APPARATUS AND METHOD FOR CHARACTER STRING RECOGNITION

(75) Inventor: Hiroshi Nakamura, Nagano (JP)

(73) Assignee: Nidec Sankyo Corporation, Nagano (JP)

(*) Notice: Subject to any disclaimer, the term of this patent is extended or adjusted under 35 U.S.C. 154(b) by 93 days.

(21) Appl. No.: 13/088,781

(22) Filed: Apr. 18, 2011

(65) Prior Publication Data

US 2011/0255795 A1 Oct. 20, 2011

(30) Foreign Application Priority Data

Apr. 19, 2010 (JP) ................. 2010-095638

(51) Int. Cl.
G06K 9/00 (2006.01)
G06K 9/34 (2006.01)
(52) U.S. Cl. ........................ 382/181; 382/177
(58) Field of Classification Search .................. None
See application file for complete search history.

(56) References Cited

U.S. PATENT DOCUMENTS

| | | | | |
|---|---|---|---|---|
| 4,894,779 A * | 1/1990 | Suzuki et al. | ..................... | 704/2 |
| 4,907,285 A * | 3/1990 | Nakano et al. | ................ | 382/176 |
| 4,985,863 A * | 1/1991 | Fujisawa et al. | ..................... | 1/1 |
| 5,119,433 A * | 6/1992 | Will | ............................. | 382/138 |
| 5,157,736 A * | 10/1992 | Boyer et al. | .................... | 382/113 |
| 5,191,612 A * | 3/1993 | Katsuyama et al. | .......... | 382/171 |
| 5,197,107 A * | 3/1993 | Katsuyama et al. | .......... | 382/209 |
| 5,254,990 A * | 10/1993 | Yoshida et al. | ................. | 341/51 |
| 5,335,290 A * | 8/1994 | Cullen et al. | .................. | 382/176 |
| 5,341,439 A * | 8/1994 | Hsu | ............................... | 382/103 |
| 5,471,610 A * | 11/1995 | Kawaguchi et al. | .......... | 707/610 |
| 5,625,710 A * | 4/1997 | Katsuyama et al. | .......... | 382/209 |
| 5,680,612 A * | 10/1997 | Asada et al. | .......................... | 1/1 |
| 5,706,496 A * | 1/1998 | Noguchi et al. | ...................... | 1/1 |
| 5,745,745 A * | 4/1998 | Tada et al. | ............................. | 1/1 |
| 5,949,906 A * | 9/1999 | Hontani et al. | ................ | 382/177 |
| 5,987,170 A * | 11/1999 | Yamamoto et al. | ........... | 382/170 |
| 6,014,460 A * | 1/2000 | Fukushima et al. | .......... | 382/177 |
| 6,035,061 A * | 3/2000 | Katsuyama et al. | .......... | 382/177 |
| 6,041,323 A * | 3/2000 | Kubota | ............................... | 1/1 |
| 6,104,833 A * | 8/2000 | Naoi et al. | .................... | 382/190 |
| 6,185,338 B1 * | 2/2001 | Nakamura | ..................... | 382/229 |
| 6,291,785 B1 * | 9/2001 | Koga et al. | .................... | 209/584 |
| 6,341,176 B1 * | 1/2002 | Shirasaki et al. | ............. | 382/229 |

FOREIGN PATENT DOCUMENTS

JP 2007-272348 10/2007

* cited by examiner

Primary Examiner — Manav Seth
(74) Attorney, Agent, or Firm — Frommer Lawrence & Haug LLP

(57) ABSTRACT

An apparatus and a method for character string recognition for correctly recognizing a character string placed on a medium, even in a recognition process system in which a plurality of formats are handled. An image processing area is set on a medium. The image processing area is divided in a placement direction of character strings so as to make up a plurality of segments. An image data projection in a direction of character strings is calculated for each segment. The number of character string lines for each segment is calculated according to the image data projection. The number of character string lines is determined for the image processing area as a whole, according to the number of character string lines for each segment, and it is judged whether or not the character strings are predetermined character strings.

10 Claims, 10 Drawing Sheets

FIG. 8

| SE# | SEGMENT NUMBER | 1 | 2 | 3 | 4 | 5 | 6 | 7 | 8 |
|---|---|---|---|---|---|---|---|---|---|
| LC1 | CHARACTER STRING CENTER POSITION | 250 | 251 | 251 | 252 | 253 | 253 | 253 | 250 |
| LC2 | CHARACTER STRING CENTER POSITION | 395 | 395 | 398 | 397 | 398 | 400 | 398 | 398 |
|  | THE NUMBER OF CHARACTER STRING LINES | 2 | 2 | 2 | 2 | 2 | 2 | 2 | 2 |

FIG. 9

| Count | THE NUMBER OF CHARACTER STRING LINES | 0 | 1 | 2 | 3 | 4 | 5 | 6 | 7 | 8 |
|---|---|---|---|---|---|---|---|---|---|---|
| Freq | FREQUENCY | 0 | 0 | 8 | 0 | 0 | 0 | 0 | 0 | 0 |

FIG. 10

| SE# | SEGMENT NUMBER | 101 | 102 | 103 | 104 | 105 | 106 | 107 | 108 |
|---|---|---|---|---|---|---|---|---|---|
| LC100 | CHARACTER STRING CENTER POSITION | 416 | 416 | 416 | 416 | 416 | 416 | 417 | 416 |
|  | THE NUMBER OF CHARACTER STRING LINES | 1 | 1 | 1 | 1 | 1 | 1 | 1 | 1 |

FIG. 11

| Count | THE NUMBER OF CHARACTER STRING LINES | 0 | 1 | 2 | 3 | 4 | 5 | 6 | 7 | 8 |
|---|---|---|---|---|---|---|---|---|---|---|
| Freq | FREQUENCY | 0 | 8 | 0 | 0 | 0 | 0 | 0 | 0 | 0 |

FIG. 14

| SE# | SEGMENT NUMBER | 1 | 2 | 3 | 4 | 5 | 6 | 7 | 8 |
|---|---|---|---|---|---|---|---|---|---|
| LC11 | CHARACTER STRING CENTER POSITION | 147 | 147 | 149 | 149 | 221 | 202 | 202 | 203 |
| LC12 | CHARACTER STRING CENTER POSITION | 0 | 416 | 416 | 416 | 416 | 416 | 417 | 416 |
|  | THE NUMBER OF CHARACTER STRING LINES | 1 | 2 | 2 | 2 | 2 | 2 | 2 | 2 |

FIG. 15

| Count | THE NUMBER OF CHARACTER STRING LINES | 0 | 1 | 2 | 3 | 4 | 5 | 6 | 7 | 8 |
|---|---|---|---|---|---|---|---|---|---|---|
| Freq | FREQUENCY | 0 | 1 | 7 | 0 | 0 | 0 | 0 | 0 | 0 |

FIG. 16

| SEGMENT NUMBER SE# | SE12~13 | SE13~14 | SE14~15 | SE15~16 | SE16~17 | SE17~18 |
|---|---|---|---|---|---|---|
| FIRST-ORDER DIFFERENCE OF CHARACTER STRING CENTER POSITIONS | 2 | 0 | 72 | -19 | 0 | 1 |
| FIRST-ORDER DIFFERENCE OF CHARACTER STRING CENTER POSITIONS | 0 | 0 | 0 | 0 | 1 | -1 |

FIG. 17

| SECOND-ORDER DIFFERENCE OF CHARACTER STRING CENTER POSITIONS | -2 | 72 | -91 | 19 | 1 |
|---|---|---|---|---|---|
| SECOND-ORDER DIFFERENCE OF CHARACTER STRING CENTER POSITIONS | 0 | 0 | 0 | 1 | -2 |

APPARATUS AND METHOD FOR CHARACTER STRING RECOGNITION

The present application claims priority from Japanese Patent Application No. JP 2010-095638 filed on Apr. 19, 2010, the disclosure of which is incorporated herein by reference in its entirety.

FIELD OF THE INVENTION

The present invention relates to an apparatus and a method for character string recognition for optically reading a character string placed on a medium (record carrier) made of paper and plastic materials.

A "character string" in the present invention means a series of multiple characters, wherein the "characters" include not only commonly-used letters of the alphabet but also symbol characters, pictograph characters, barcodes, 2D codes, as well as numeric characters, and they may be in any form and any size as far as they can be recognized visually on a medium. Furthermore, it does not matter whether the characters are type characters or handwritten characters.

DESCRIPTION OF RELATED ART

Conventionally known are apparatuses and methods for character string recognition in order to recognize a character printed a surface of a medium such as a check. In the case of such an apparatus and a method for recognizing a character string, when a transfer speed of a medium fluctuates due to manual operation so as to cause a distortion of an image for character string recognition in a medium transfer direction, accordingly sometimes the image is also distorted in a direction perpendicular to the medium transfer direction (For example, sometimes the character string eventually becomes tilted and undulated). Moreover, if a bottom side of the medium is detached from a medium transfer path of an imaging device (the apparatus for character recognition), the image is also distorted sometimes in a direction perpendicular to the medium transfer direction.

To solve such a problem, for example, a method for character recognition disclosed in Japanese Unexamined Patent Application Publication No. 2007-272348 ("JP 2007-272348") includes; a first step of calculating projection data of an objective image in a direction of an objective character string placed on a medium (a placement direction of the characters, which is called a "horizontal direction"), while shifting an objective projecting position at least for one pixel in a direction perpendicular to the direction of the character string (which is called a "vertical direction"); and a second step of detecting a position of the character string in the vertical direction according to the first projection data obtained through the first step; wherein in the first step described above, the image data is divided into a certain number of sections (segments) in the direction of the character string, and subsequently the projection data is calculated in the horizontal direction for each segment.

More specifically, in the calculation of the projection data in the horizontal direction (the first projection data) that is required for detecting the position of the character string in the vertical direction, a range for adding pixel values does not cover an entire width along a transfer direction of the medium or the direction of the character string, but the range is equally segmented into a certain number of segments and the projection data of each segment is calculated in the horizontal direction while having a length of the segment as the range for adding pixel values. Therefore, even if the character string is tilted, it is still possible to suppress the effect that the first projection data becomes dull because of the tilt. As a result, even when the image is distorted in the direction perpendicular to the direction of the character string, a decrease in accuracy for character string recognition can be avoided.

Unfortunately in the method for character recognition disclosed in JP 2007-272348; if the number of character string lines detected for each segment satisfies the condition on the number of lines of an assumed format even when a medium having a format different from the assumed format with respect to the character string is loaded, it is wrongly judged that a medium having the assumed format is loaded. As a result, reading operation cannot be carried out correctly. In the above explanation, the format is concerned with a position and an extent of an area where characters are written, the number of character strings, the number of characters, the size of characters, and the like.

SUMMARY OF THE INVENTION

It is an object of the present invention to provide an apparatus and a method for character string recognition that make it possible to recognize each format correctly even in a recognition process system in which a plurality of formats are handled.

To solve the problem identified above, an aspect of Claim 1 of the present invention is a character string recognition apparatus, for recognizing a character string through processing image data obtained by imaging the character string placed on a medium, comprising: means for setting a character string search area for setting the character string search area on the medium; means for preparing segments for making up a plurality of segments by segmenting the character string search area in a direction of the character string; means for calculating projection for calculating the projection of the image data in direction of the character string for each of the segments; means for calculating the number of character string lines for calculating the number of character string lines for each of the segments according to the projection of the image data; means for determining the number of character string lines for determining the number of character string lines in the character string search area as a whole according to the number of character string lines in each of the segments; and means for checking the character string validity for verifying whether or not the character string is a predetermined character string, according to the number of character string lines in the character string search area as a whole.

In addition to the configuration described in Claim 1, an aspect of Claim 2 of the present invention is the character string recognition apparatus: wherein the means for determining the number of character string lines creates a frequency distribution on the number of segments showing a predetermined number of character string lines according to data of the number of character string lines in each of the segments, and determines the number of character string lines in the character string search area as a whole, with the number of character string lines having a maximum frequency.

In addition to the configuration described in Claim 2, an aspect of Claim 3 of the present invention is the character string recognition apparatus: wherein the means for setting a character string search area sets another character string search area, being different from the formentioned character string search area, over the medium if the frequency distribution on the number of segments showing the predetermined number of character string lines is not normal.

In addition to the configuration described in Claim 2, an aspect of Claim 4 of the present invention is the character string recognition apparatus: wherein the means for preparing segments increases/decreases the number of segments for the character string search area to make up another type of segments, being different from the formentioned segments if the frequency distribution on the number of segments showing the predetermined number of character string lines is not normal.

In addition to the configuration described in any one of Claims 1 to 4, an aspect of Claim 5 of the present invention is the character string recognition apparatus: wherein the means for checking the character string validity calculates character string positions in a direction perpendicular to the direction of the character string for each of the segments, and checks the presence of unusual data in the character strings according to first-order differences of positions of the character string, and then judges that the character strings are predetermined character strings if no unusual data is detected in the character strings.

In addition to the configuration described in Claim 5, an aspect of Claim 6 of the present invention is the character string recognition apparatus: wherein the means for setting a character string search area sets another character string search area, being different from the formentioned character string search area, over the medium if unusual data is detected in the character strings.

In addition to the configuration described in Claim 5, an aspect of Claim 7 of the present invention is the character string recognition apparatus: wherein, at the time of checking the presence of unusual data in the character strings, the means for checking the character string validity judges that unusual data exists in the character strings if a maximum absolute value of second-order differences of character string positions with respect to each of the segments exceeds a predetermined threshold.

In addition to the configuration described in Claim 5, an aspect of Claim 8 of the present invention is the character string recognition apparatus: wherein the character string positions are character string center positions.

In addition to the configuration described in any one of Claims 1 to 4, an aspect of Claim 9 of the present invention is the character string recognition apparatus: wherein the number of segments to be made up is n-th power of 2 (where the "n" is a positive integer).

An aspect of Claim 10 of the present invention is a character string recognition method, for recognizing a character string through processing image data obtained by imaging the character string placed on a medium, comprising: a character string search area setting step for setting the character string search area on the medium; a segment preparing step for making up a plurality of segments by segmenting the character string search area in a direction of the character string; a projection calculating step for calculating the projection of the image data in direction of the character string for each of the segments; a step for calculating the number of character string lines for calculating the number of character string lines for each of the segments according to the projection of the image data; a step for determining the number of character string lines for determining the number of character string lines in the character string search area as a whole according to the number of character string lines in each of the segments; and a step for checking the character string validity for verifying whether or not the character string is a predetermined character string, according to the number of character string lines in the character string search area as a whole.

The apparatus and method for character string recognition according to the present invention enables recognizing each format correctly even in a recognition process system in which a plurality of formats are expected.

Furthermore, according to the present invention, an area for character string search on a medium is divided into a plurality of segments in a direction of the character string, and the number of character string lines of the entire area for character string search is determined according to the number of character string lines in each of these segments. Then, according to the number of character string lines, a validity of the character string (whether or not the character string is a predetermined character string) can be verified.

BRIEF DESCRIPTION OF THE DRAWINGS

FIG. 8 is a list showing the number of character string lines in each segment of the image data shown in FIG. 6.

FIG. 9 is a frequency distribution list on the number of segments showing a predetermined number of character string lines in accordance with the number of character string lines shown in FIG. 8.

FIG. 10 is a list showing another example of the number of character string lines in each segment.

FIG. 11 is a frequency distribution list on the number of segments showing the predetermined number of character string lines in accordance with the number of character string lines shown in FIG. 10.

FIG. 14 is a list showing the number of character string lines in each segment of the image data shown in FIG. 12.

FIG. 15 is a frequency distribution list on the number of segments showing the predetermined number of character string lines in accordance with the number of character string lines shown in FIG. 14.

FIG. 16 is a list showing a first-order difference of character string center positions in the image data shown in FIG. 12.

FIG. 17 is a list showing a second-order difference of character string center positions in the image data shown in FIG. 12.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

First Embodiment of the Present Invention

FIGS. 1 to 18 represent a first embodiment of the present invention.

Figure 1:
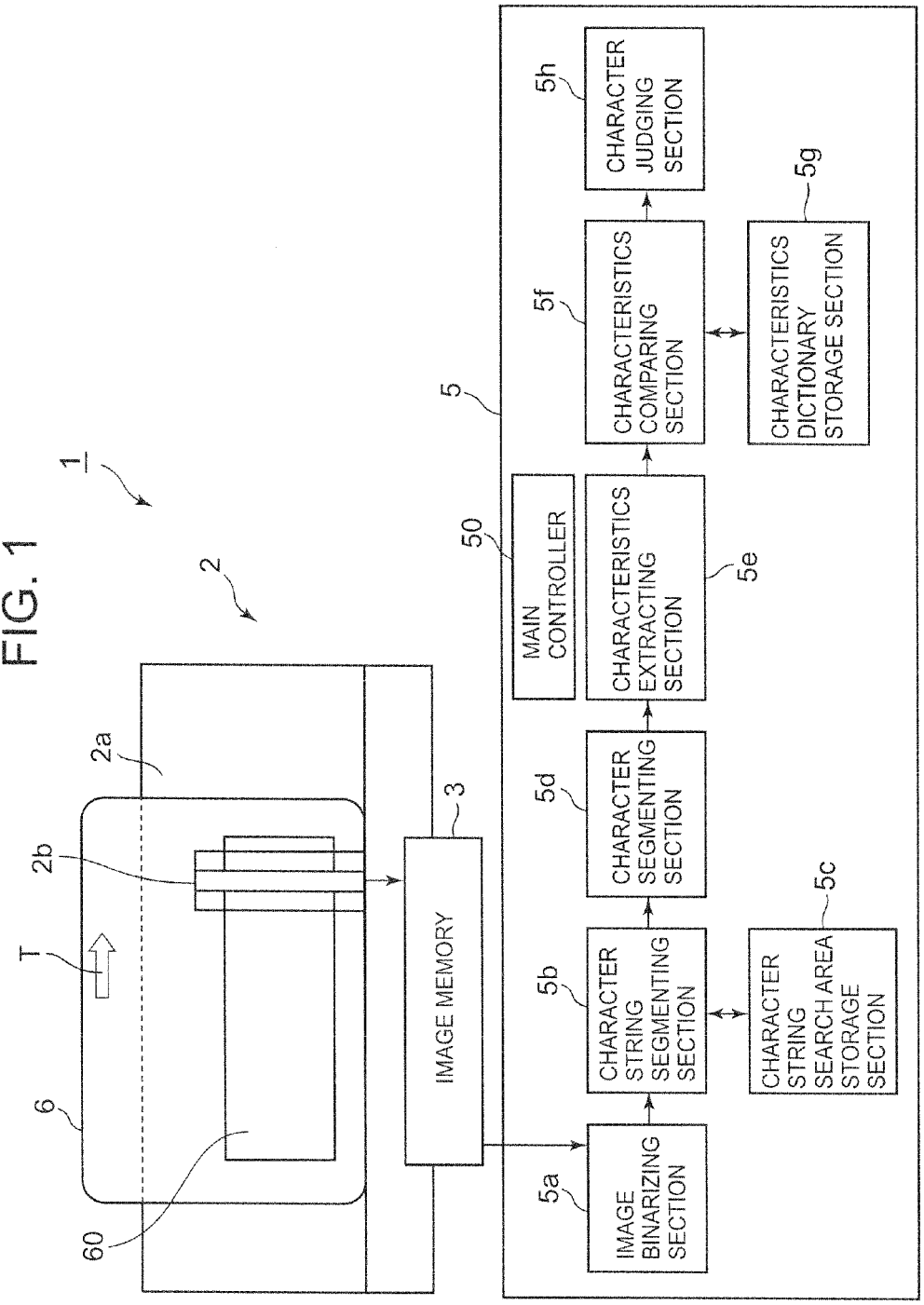
FIG. 1 is a block diagram showing an electrical structure of a character string recognition apparatus in accordance with a first embodiment of the present invention.

Configuration of Character String Recognition Apparatus:

As shown in FIG. 1, a character string recognition apparatus 1 in accordance with the first embodiment is an apparatus for recognizing a character string printed in a character recording area 60 through processing image data obtained by imaging the character recording area 60 placed on an ID card (an identification card) 6 (hereinafter, called "ID card 6") as a medium. The character string recognition apparatus 1 includes a data input section 2, an image memory 3, and a data processor 5.

The data input section 2 captures an image of the character recording area 60 positioned on the ID card 6, and converts the image into multi-valued image data, and then saves the data into the image memory 3. In the first embodiment, the character string recognition apparatus 1 includes a medium transfer mechanism 2a for transferring the ID card 6, and an one-dimensional contact imaging element 2b for imaging and reading the character recording area 60 positioned on the ID card 6, as shown in FIG. 1.

The medium transfer mechanism 2a transfers the ID card 6 in a predetermined transfer direction "T" (from the left to the right in FIG. 1) by using a transfer means that is not shown. In the first embodiment, a transfer guide 2c is formed in the medium transfer mechanism 2a so as to transfer the ID card 6 while keeping one side of the ID card 6 (a bottom side of the card in FIG. 1) contacting the transfer guide 2c.

The imaging element 2b is a line sensor composed of CCDs and the like, and constituent components of the imaging element 2b are placed in line in a direction almost perpendicular to the transfer direction "T" (a width-wise direction of the ID card 6). As shown in FIG. 1, the imaging element 2b is so formed as to be longer than a width of the character recording area 60 in its width-wise direction, the character recording area 60 being formed on the ID card 6. Incidentally, in the first embodiment, while the analog image data being output from the imaging element 2b, an analog-digital converter circuit not shown is connected in the character string recognition apparatus 1, and then the analog-digital converter circuit converts the analog image data into digital image data. More specifically, the analog image data is converted, for example, into 8-bit 256-level multi-valued image data, and output to the image memory 3. Since such an analog-digital converter circuit is publicly known, detailed explanation is omitted here.

The image memory 3 is provided with a function for dealing with the multi-valued image data obtained through the image capturing as a matrix including a limited number of pixels, and saving the data arbitrarily while reading out a pixel value of each pixel as a brightness value. The brightness value is expressed with a numeric value within a certain range. Specifically to describe, brightness values of 8-bit 256-level multi-valued image data are expressed with integers within a range from 0 to 255. Furthermore, in the first embodiment, M×N pixels are placed and configured as a matrix for saving the multi-valued image data of an entire section of the character recording area 60 into the M×N blocks. The image memory 3 may be structured with any of a RAM, an SDRAM, a DDRSDRAM, an RDRAM, and the like, as far as it can arbitrarily read out and save the multi-valued image data.

Moreover, the image memory 3 has a function for saving black-and-white binary image data created by an image binarizing section 5a to be described later.

As shown in FIG. 1, the data processor 5 includes; a main controller 50 for controlling an entire section of the data processor 5, the image binarizing section 5a, a character string segmenting section 5b, a character string search area storage section 5c, a character segmenting section 5d, a characteristics extracting section 5e, a characteristics comparing section 5f, a characteristics dictionary storage section 5g, and a character judging section 5h.

The image binarizing section 5a converts the multi-valued image data saved in the image memory 3 into binary image data. For the binarizing operation, a binarizing threshold is calculated through a publicly-known appropriate method such as a discrimination analysis method. Then, a pixel having a brightness value, which is relatively high in the multi-valued image data, is identified as a white element; and on the other hand, a pixel having a relatively low brightness value is identified as a black element. Through such an operation, the multi-valued image data is converted into black-and-white binary image data. Then, eventually the binary image data of the entire section of the character recording area 60 is created in the M×N blocks that is configured with the M×N pixels placed as a matrix.

Figure 2:
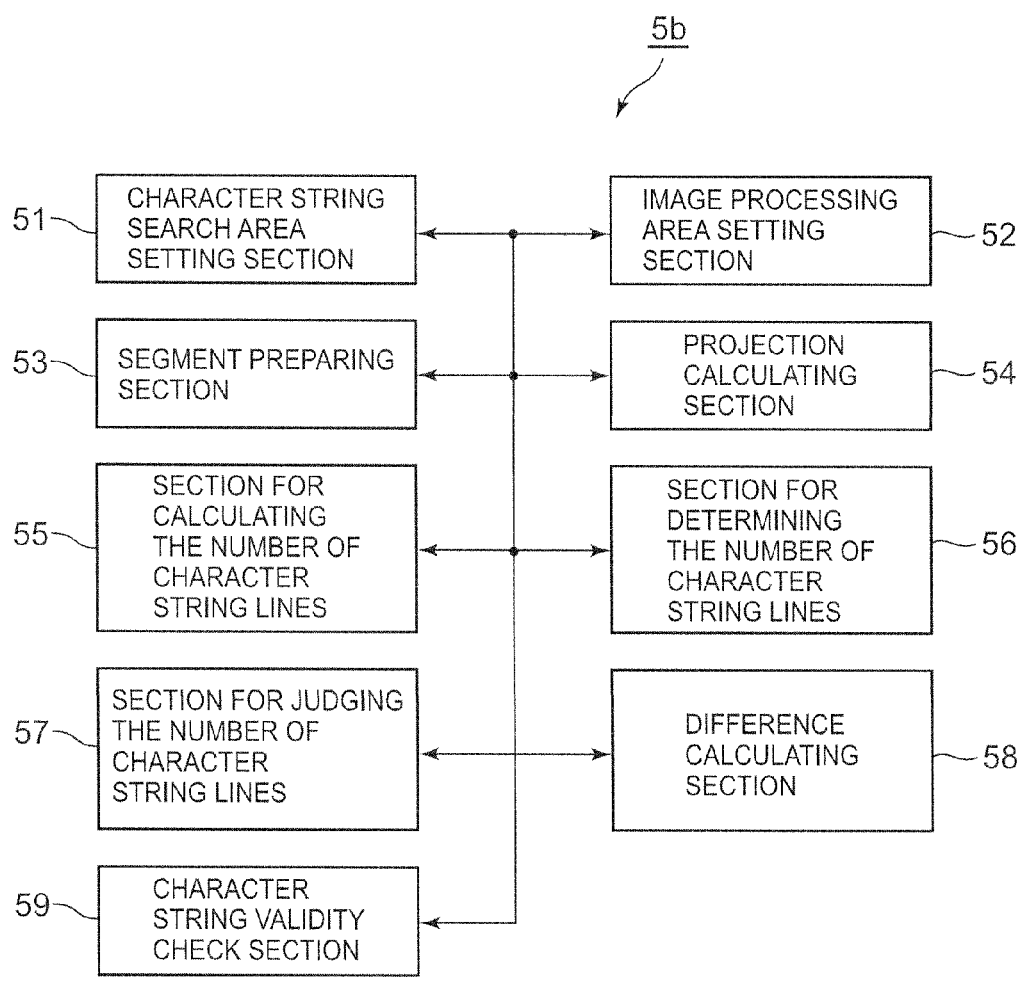
FIG. 2 is a block diagram showing a character segmenting section of the character string recognition apparatus shown in FIG. 1.

The character string segmenting section 5b segments a character string out of the binary image data obtained in the image binarizing section 5a. As shown in FIG. 2, in the present embodiment, the character string segmenting section 5b includes; a character string search area setting section 51, an image processing area setting section 52, a segment preparing section 53, a projection calculating section 54, a section for calculating the number of character string lines 55, a section for determining the number of character string lines 56, a section for judging the number of character string lines 57, a difference calculating section 58, and a character string validity check section 59. In the meantime, the character string segmenting section 5b is under control of the main controller 50.

Figure 5:
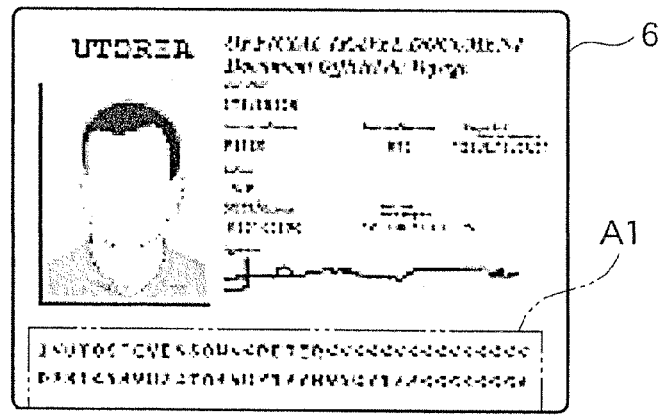
FIG. 5 is a front view of an ID card.
Figure 6:
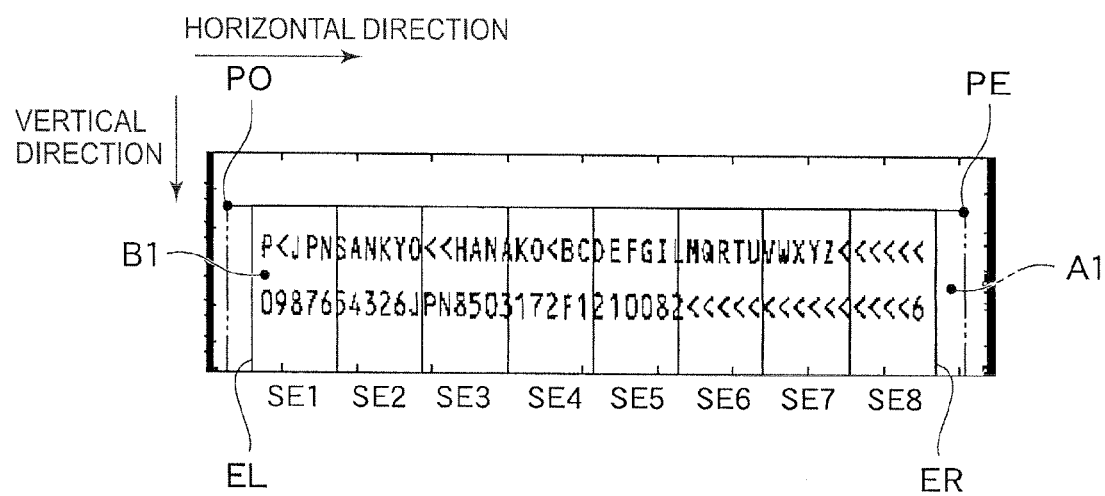
FIG. 6 shows a first example of image data captured by imaging a character string placed on a medium.

The character string search area storage section 5c stores information on positions, shapes, and the like of character string search areas corresponding to various kinds of media (including a check, a credit card, and so on in addition to the ID card 6) that the character string recognition apparatus 1 can handle. For example, a rectangular character string search area A1 is placed in a lower section in the ID card 6, as shown in FIG. 5. Meanwhile, personal information including a face photo, a name, an address, and the like is printed in a higher area. As shown in FIG. 6, the character string search area A1 in the first embodiment is set as an area smaller than the character recording area 60 that FIG. 1 shows.

The character segmenting section 5d estimates a single-character area through calculating, for example, characteristics of a circumscribing rectangle, a placement direction of a character string of black pixels, histogram characteristics in a direction perpendicular to the placement direction, and the like according to a binary image data of a character string segmented in the character string segmenting section 5b for segmenting each character as binary image data.

The characteristics extracting section 5e extracts a characteristics vector of the binary image data of each character segmented in the character segmenting section 5d. Extracted as characteristics of each character are edge orientation characteristics of the character, stroke density characteristics of the character, structure-analysis characteristics, and so on. In the first embodiment, any characteristics extraction method can be applied arbitrarily.

The characteristics comparing section 5f associates the characteristics vector of the binary image data of the character to be recognized with a standard characteristics vector registered in the characteristics dictionary storage section 5g, and makes a judgment on a validation level through, for example, checking whether a distance value, a degree of similarity, and a characteristics element included in the standard characteristics vector exit in the characteristics vector of the binary image data of the character to be recognized in order to output a recognition candidate character.

The characteristics dictionary storage section 5g stores standard characteristics vectors of all characters to be used in the ID card 6.

The character judging section 5h outputs the recognition candidate character output from the characteristics comparing section 5f as the character used in the ID card 6.

Procedure of Character String Recognition Method:

With reference to the flowchart shown in FIG. 3, a series of operation procedures in a character string recognition method is described next.

In order to recognize the character string placed on the ID card 6 by using the character string recognition apparatus 1 provided with the configuration described above, the ID card 6 is transferred along the transfer guide of the medium transfer mechanism 2a in the data input section 2. In the meantime, as the ID card 6 passes by the one-dimensional imaging element 2b of the data input section 2, captured is an image of a surface of the ID card 6 including the character recording area 60 where the character string is printed. An optical image is captured by the one-dimensional imaging element 2b, and an analog image signal obtained through the image capturing is photo-electrically converted; namely, converted into digital multi-level data such as 8-bit 256-level multi-valued image data, and then the converted image data is saved in the image memory 3. The image memory 3 outputs the multi-valued image data to the data processor 5. As described below in detail, the data processor 5 executes a series of character string recognition procedures (including; an image binarizing step, a character string segmenting step, a character segmenting step, a characteristics extracting step, a characteristics comparing step, and a character recognition step) in due order.

Image Binarizing Step:

At first in Step S1, the image binarizing section 5a carries out the image binarizing step. More specifically, the image binarizing section 5a reads out the multi-valued image data from the image memory 3, and converts the multi-valued image data into binary image data. Then, the binary image data converted is stored in the image memory 3, while being stored as binary image data into a memory area being different from a memory area in which the multi-valued image data is stored. The black-and-white binary image data is used hereafter in the following steps.

Character String Segmenting Step:

After the image binarization, operation progresses to Step S2, and the character string segmenting section 5b carries out the character string segmenting step. The character string segmenting step is described in the following explanation, with reference to the flowchart shown in FIG. 4.

At first, in Step S11 (a character string search area setting step), the character string search area setting section 51 of the character string segmenting section 5b reads out information on a position, a shape, and the like of the character string search area A1 corresponding to the ID card 6, from the character string search area storage section 5c. Concretely to describe, the rectangular character string search area A1 is set at a confined section in which two character strings are formed, as FIG. 6 shows.

Furthermore, in Step S12 (an image processing area setting step), the image processing area setting section 52 of the character string segmenting section 5b detects a left edge EL and a right edge ER of the two character strings, as FIG. 6 shows, to narrow a section of the character string search area A1 in the direction of the character strings for setting an image processing area (effective area) B1. In other words, the image processing area (effective area) B1 is a rectangle that circumscribes the left edge EL and the right edge ER of the segmented character strings. Namely, the image processing area (effective area) B1 is an area effective for the processing operation where the following steps from the character string segmenting step down to the character recognizing step become effective.

Concretely to describe, in vertical projection data obtained through scanning operation in a direction toward the right, starting from a left top point PO, as a start point, in the binary character string search area A1; if a count value (the number of detected black pixels) at each pixel row successively exceeds a predetermined threshold for a certain number of times (e.g., 3 times), a position shifted back for several pixels toward the left from a first one of the pixel rows exceeding the threshold is defined as the left edge EL of the image processing area B1. Meanwhile, in vertical projection data obtained through scanning operation in a direction toward the left, starting from a right top point PE, as a start point, in the character string search area A1; if a count value at each pixel row successively exceeds the predetermined threshold for the certain number of times, a position shifted back for several pixels toward the right from a first one of the pixel rows exceeding the threshold is defined as the right edge ER of the image processing area B1. Thus, the image processing area B1 is set within the character string search area A1.

As FIG. 6 shows, a dimension in the vertical direction (i.e., a width) of the image processing area (effective area) B1 is the same as that of the character string search area A1.

In the above explanation, the "scanning operation" means calculating the image data projection, while shifting an objective projecting position in the binary image data (a matrix including pixel elements) for at least one pixel in a line (horizontal) direction or a row (vertical) direction; wherein a direction of the image data projection being perpendicular to the shifting direction of the objective projecting position. Namely, calculating the image data projection is to sum up a projected density (i.e., density distribution/histogram) in which the number of pixels converted into "1" or "0" through binarization is summed up for each digit group. In the calculation, either of white pixels and black pixels may be summed up; and in the present embodiment, black pixels are summed up.

Next, in Step S13 (a segment preparing step), the segment preparing section 53 makes up 8 segments SE (from SE1 to SE8) by segmenting the image processing area B1 in a placement direction of character strings placed on the ID card 6 (a horizontal direction), as shown in FIG. 6. The number of segments SE to be made up is set to be 8 in this case, but any other number may be applied. When the number of segments SE to be made up is n-th power of 2 (wherein the "n" is a positive integer for example, 2, 4, 8, 16 and so on), a post-processing advantageously becomes easy.

In Step S14 (a projection calculating step) next, the projection calculating section 54 calculates a horizontal binary image data projection in a direction of character strings placed on ID card 6 (a horizontal direction), for each of the segments SE1 to SE8. More specifically, while shifting an objective projecting position in a direction perpendicular to the direction of the character strings (a vertical direction), the number of pixels having binary image data "1" corresponding to black pixels in each pixel line is summed up in order to create a horizontal projection histogram. Then, corresponding to the arrangement of 8 segments SE shown in FIG. 6, a horizontal projection curve shown in FIG. 7 is obtained.

Figure 7:
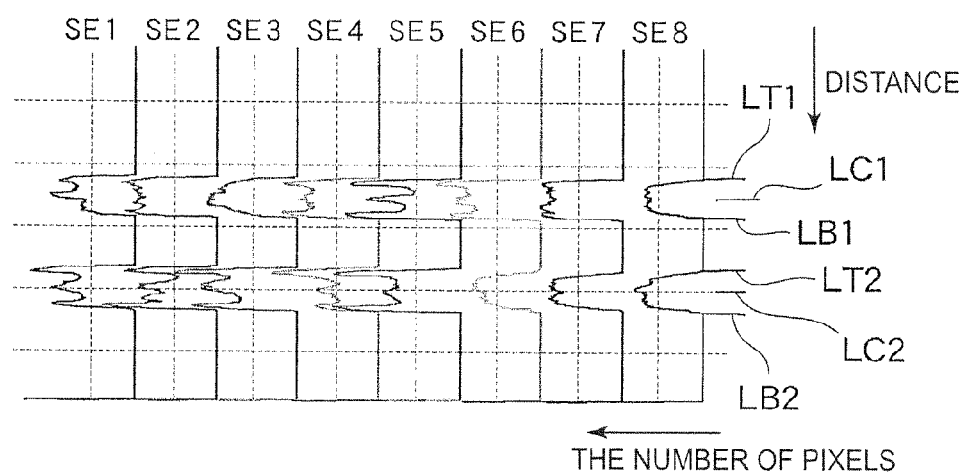
FIG. 7 shows a horizontal projection curve as a result of projecting the image data shown in FIG. 6 in a direction of a character string.

For each segment SE shown in FIG. 7, a horizontal axis represents the number of pixels having binary image data "1" corresponding to black pixels, wherein a right end of each segment is a baseline for the number of black pixels being 0. When the number of black pixels increases, a brightness value decreases to make the graph line curved from the right to the left. In the meantime, a vertical axis represents a position within an area (distance) from the top end to the bottom end of the image processing area B1.

Next, in Step S15 (a step for calculating the number of character string lines), the section for calculating the number of character string lines 55 calculates a center position(s) and the number of lines of character strings for each segment SE by making use of the horizontal projection curve created for each segment SE in the projection calculating section 54. For example, a list shown in FIG. 8 indicates a calculation result according to the horizontal projection curve (the horizontal projection histogram of the binary image data) shown in FIG. 7; namely, the list shows center positions and the number of lines with respect to 2 character strings for each of segments SE1 to SE8.

Specifically, in the calculation step for the segment SE8 shown in FIG. 7; starting from a start point "S" (the start point "S" is predetermined with a number appropriate for the ID card 6), a search operation is carried out along the projection data in a direction toward the bottom to find a point LT1, at which a brightness value begins decreasing (to become lower than a predetermined threshold), and another point LB1, at which a brightness value increases to recover (to become higher than the predetermined threshold). Then, a middle point LC1 between the two points, namely a point given by calculation of (LT1+LB1)/2, is saved as an upper character string center position shown in FIG. 6. In the same manner, for a character string coming up next at a lower place, the search operation continues until it reaches an end of the projection data to find a point LT2 and another point LB2. Then, another middle point LC2 between the two points, namely a point given by calculation of (LT2+LB2)/2, is saved as a lower character string center position shown in FIG. 6. In the same manner, for each of the segments SE1 to SE7, the number of character string center positions is counted to define the number as the number of character string lines. In the first embodiment, 2 character strings are formed in the ID card 6, as shown in FIG. 5, FIG. 6, and FIG. 7. Therefore, in an example shown in FIG. 8, the number of character string lines is 2 in every segment SE. Incidentally, the character string center positions indicating the middle point LC1 have values in a range of 250 to 253 in FIG. 8, which are deemed to be within an allowable range, so as to conclude that these center positions are for the same character string at the upper side. In the same way, the character string center positions indicating the middle point LC2 have values in a range of 395 to 400, deemed to be within an allowable range, so as to conclude that these center positions are for the same character string at the lower side.

In the case of any medium other than an ID card 6, being not shown, sometimes there is formed one character string in a character string search area. FIG. 10 shows such a case in which the number of character string lines is calculated for one character string. In an example of FIG. 10, the character string center positions for all the segments SE1 to SE8 are almost 416, and therefore the number of character string lines is 1 in this case.

Thus, in the first embodiment, the character string center positions are dealt with as positions of character strings, and therefore a post-processing is advantageously simplified.

Next, in Step S16 (a step for determining the number of character string lines), the section for determining the number of character string lines 56 creates a frequency distribution on the number of segments showing a predetermined number of character string lines, according to data of the number of character string lines in the segments SE1 to SE8 obtained through Step S15, as shown in FIG. 9. Then, with reference to the frequency distribution, the number of character string lines is determined.

For example, in the example of FIG. 8, the number of character string lines in all the segments SE1 to SE8 is 2. Thus, as shown in FIG. 9, a frequency for the number of character string lines being 2 is 8, and other frequencies are all zero. As a result, it is determined that the number of character string lines is 2. Consequently, for the image processing area B1 as a whole, the number of character string lines is determined to be 2.

In the same way, in the example of FIG. 10, the number of character string lines in all the segments SE is 1. Thus, as shown in FIG. 11, a frequency for the number of character string lines being 1 is 8, and other frequencies are all zero. As a result, it is determined that the number of character string lines is 1. Consequently, for the image processing area B1 as a whole, the number of character string lines is determined to be 1.

Owing to, for example, an effect of an arrangement of the segments SE, sometimes the number of character string lines for each segment SE does not necessarily become the same. The segments SE at both ends (i.e., SE1 and SE8) in particular include some blank spaces at the right and left sides of the character strings so that an error in the number of character strings may be caused. In such a case, a maximum frequency becomes less than the number of prepared segments SE (i.e., 8). However, a frequency being 7 is dealt with as an allowable number For example, in the case shown in FIG. 8, if a frequency for the number of character string lines being 2 is 7, it is judged that the frequency distribution on the number of segments showing the predetermined number of character string lines is normal. Namely, even though either of the segments SE at both the ends has an effect of the end segment so as to result in the number of character string lines being less than the actual number, the number of character string lines is assumed to be still effective. In this case, 7 segments SE other than either of the segments SE at both the ends have the same number of character string lines, and therefore it is judged that the reliability of the number is high enough.

Next, in Step S17 (a step for judging the number of character string lines) for excluding any case where the medium is not an ID card 6 having the predetermined format, the section for judging the number of character string lines 57 judges whether or not the frequency distribution on the number of segments showing the predetermined number of character string lines is normal, according to the number of character string lines for each segment SE prepared in Step S13. As a result, if it is judged according to the number of character string lines for each prepared segment SE that the frequency distribution on the number of segments showing the predetermined number of character string lines is not normal, it is determined that the medium is not an ID card 6, and operation progresses to Step S20. On the other hand, if it is judged that the frequency distribution on the number of segments showing the predetermined number of character string lines is normal, it is supposed that the medium has a possibility of being an ID card 6, and operation progresses to Step S18 to determine that the medium is an ID card 6.

If a Medium Having a Format Different from that of an ID Card 6 is Loaded:

In the above step, even if it is judged according to the number of character string lines for each segment SE that the frequency distribution on the number of segments showing the predetermined number of character string lines is normal, it cannot be declared that the medium is an ID card 6. A reason why it cannot be declared is that the frequency distribution being normal is not a sufficient condition that the medium is an ID card 6. In other words, as exemplified below, there is assumed a case where the medium is not an ID card 6 even though the frequency distribution on the number of segments showing the predetermined number of character string lines is normal.

Figure 12:
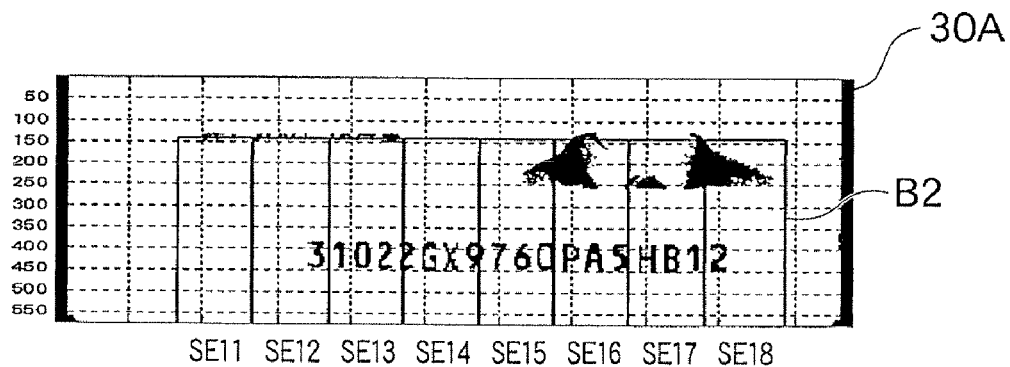
FIG. 12 shows a second example of image data captured through imaging a character string placed on a medium.
Figure 13:
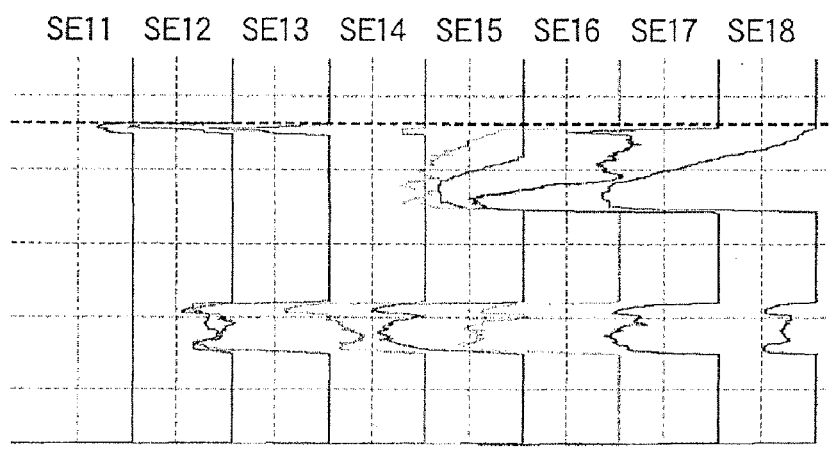
FIG. 13 shows a horizontal projection curve as a result of projecting the image data shown in FIG. 12 in a direction of a character string.

Concretely to describe, taken for example is a case where a medium having a character string format different from that of an ID card 6 is loaded. For example, loaded is a medium different from an ID card 6, such as shown in FIG. 12 (e.g., a credit card, a company ID card, and the like). In an image processing area B2 of the medium shown in FIG. 12, one character string is formed almost at a center of the image processing area B2, and a part of a face photo is also printed at a right upper end in the area. When such a medium described above is loaded into a processing system, a processed result of the character string segmentation is as FIGS. 13 to 15 show. FIG. 13 shows a horizontal projection curve corresponding to an arrangement of 8 segments SE 11 to SE18 shown in FIG. 12. In FIG. 13, a horizontal axis represents the number of pixels, and in the meantime, a vertical axis represents a position in a range (distance) from the top end to the bottom end of the image processing area B2. A list shown in FIG. 14 indicates a calculation result according to the horizontal projection curve; namely, showing center positions and the number of lines with respect to 1 character string for each of the segments SE11 to SE18. FIG. 15 indicates a frequency distribution on the number of segments showing a predetermined number of character string lines, according to data of the number of character string lines in each of the segments SE11 to SE18.

In FIG. 15, a frequency for the number of character string lines being 2 is 7 so as to satisfy the condition for determination of the number of character string lines that requires a frequency of 7 or greater. Thus, apparently the number of character string lines is 2, and therefore the medium is judged to be an ID card 6. This is because, owing to a location state of some image data other than a character string in relation with the segments SE, the image data satisfies the condition of being an actual character string. As a result, according to the number of character string lines for each of the segments SE, it is wrongly judged that the frequency distribution on the number of segments showing the predetermined number of character string lines is normal. Consequently, it cannot be judged that the medium is not an ID card 6.

In order to avoid such a mis-judgment described above; based on an assumption that, in the case of a medium being an ID card 6, a character string center position does not significantly shift between two neighboring segments SE, the presence of any unusual data within the character strings is checked in Step S18 and Step S19 even if it is supposed that the medium has a possibility of being an ID card 6. More specifically, a second-order difference of character string center positions is calculated between segments SE, and then any presence of unusual data within the character strings is checked by making use of the second-order difference (Step S18). Thus, it is determined whether or not the character strings are predetermined character strings on an ID card 6, namely whether the medium is an ID card 6 for sure (Step S19) or not. These steps are described below.

In Step S18 (a step for checking any character string unusual data), the difference calculating section 58 calculates a first-order difference and a second-order difference of the character string center positions shown in FIG. 16 and FIG. 17, with respect to each character string, as an indicator for indicating unusual data in the character string. FIG. 16 is a list showing a first-order difference of character string center positions in the image data shown in FIG. 12, and in the meantime, FIG. 17 is a list showing a second-order difference further according to the first-order difference.

Concretely to describe, at first the difference calculating section 58 calculates a first-order difference of character string center positions between two segments neighboring each other. For example, in upper data LC11 assumed to be a character string in FIG. 14 showing the number of character string lines and character string center positions for each segment in the image data shown in FIG. 12; LC11 of a segment SE13 is equal to 149, and LC11 of a segment SE12 located at SE13's immediate left is equal to 147. Therefore, a difference between both the LC11s is 2. In the same manner, other first-order differences of character string center positions with respect to other segments are also calculated to create a list of FIG. 16. Next, by making use of the calculation result of the first-order differences, second-order differences of character string center positions are calculated with respect to each of the segments SE as shown in FIG. 17 to create a list of FIG. 17. For example, in FIG. 17, a second-order difference "−91" at a third column from the left in the upper row is a remainder as a result of subtracting a first-order difference "72" between SE14 and SE 15 from a first-order difference "−19" between SE15 and SE 16, with respect to the character strings in the upper raw shown in FIG. 16, wherein the first-order difference between SE14 and SE 15 being placed at the left side of the first-order difference between SE15 and SE 16.

Next, in Step S19 (a step for checking the character string validity), it is checked whether or not the medium is an ID card 6. Concretely to describe, the character string validity check section 59 verifies for each character string whether a maximum absolute value of the second-order differences of character string center positions with respect to each of the segments SE exceeds a predetermined threshold (for example, "20"). Then, if the maximum absolute value of the second-order differences exceeds the predetermined threshold, it is judged that there exists unusual data in the character strings, and the character strings on the medium are not the predetermined character strings (namely, the medium is not an ID card 6). On the other hand, if not, it is judged that there does not exist any unusual data in the character strings, and the character strings on the medium are the predetermined character strings (namely, the medium is an ID card 6).

For example, in the case shown in FIG. 17, the second-order differences of character string center positions of the upper character string reads; −2, 72, −91, 19, and 1 in due order from the left so that a maximum absolute value of the second-order differences of character string center positions with respect to each of the segments SE is "91". Since this value is unusually large in comparison with the threshold value "20" defined above, it is judged that the upper character string includes unusual data. In the meantime, the second-order differences of character string center positions of the lower character string are; 0, 0, 0, 1, and −2 in due order from the left so that a maximum absolute value is "2" in this case. Thus, this value is less than the threshold value "20", it is judged that the lower character string has normal data. According to these results, since the upper character string includes unusual data, it is concluded that the medium is not an ID card 6.

Thus, even when the medium being actually not an ID card 6 brings about by chance a state equivalent to what true character strings of an ID card 6 create, it can still be judged through Step S18 (the step for checking any character string unusual data) and Step S19 (the step for checking the character string validity) that the medium is not an ID card 6.

Moreover, as described above, the image processing area B2 set in a medium other than an ID card 6 is divided into a plurality of segments SE, and then any presence of unusual data within the character strings is checked by making use of the second-order differences of character string center positions with respect to each of the segments SE. Therefore, even in the case where character strings placed on the medium are tilted, a chance of reading the character strings correctly is improved.

Figure 4:
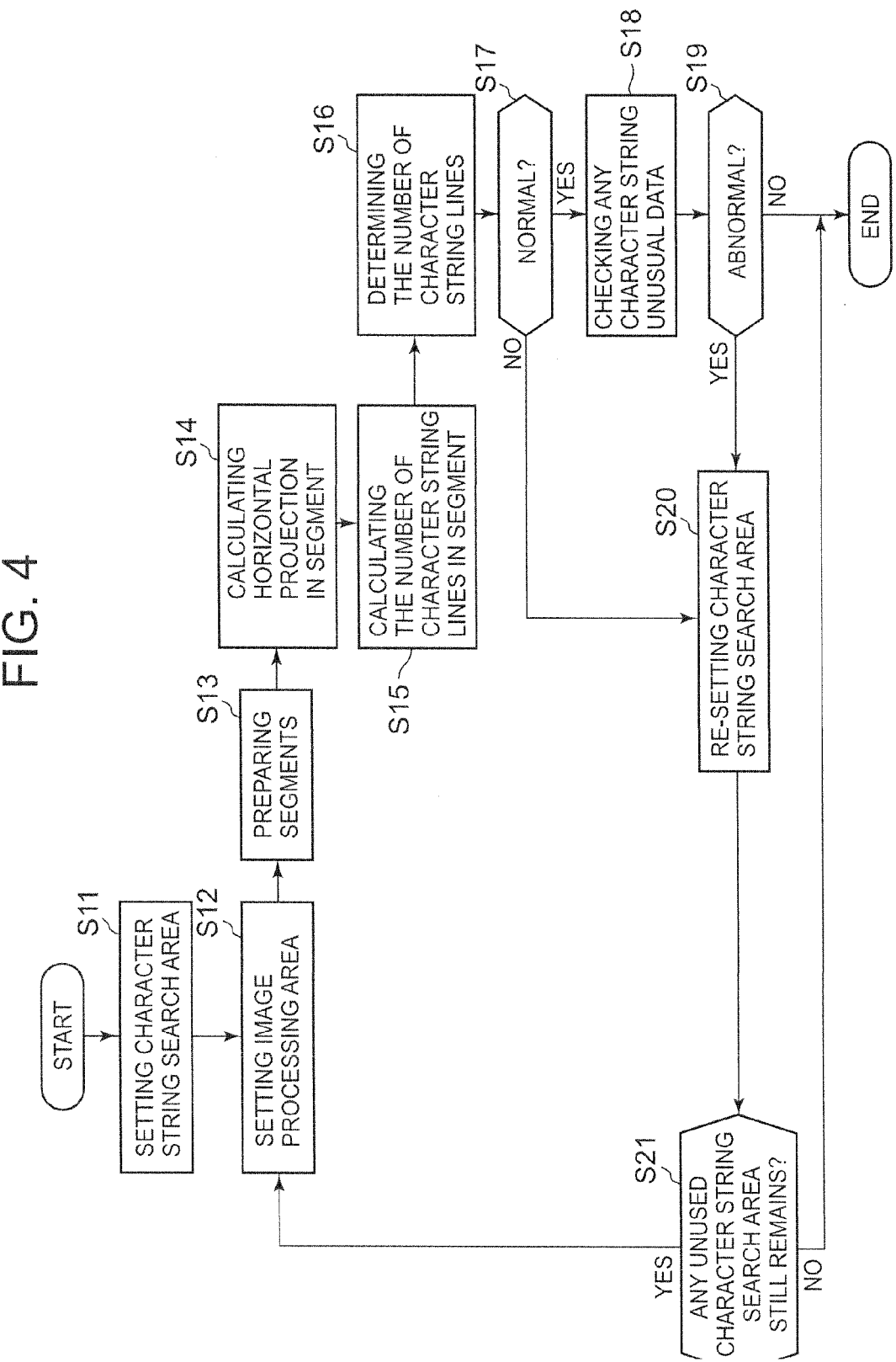
FIG. 4 is a flowchart describing a detailed operation flow of character string segmentation in the flowchart shown in FIG. 3.

Then, if it is judged as a result of the process through Step S19 that the medium is an ID card 6, it is concluded that the character strings do not include any unusual data, and operation of the flowchart shown in FIG. 4 finishes.

On the other hand, if it is judged that the medium is not an ID card 6, operation progresses to Step S20 (a character string search area re-setting step) in the same manner as a case where the medium is judged not to be an ID card 6 in the forgoing Step S17.

In Step S20, the character string search area setting section 51 of the character string segmenting section 5*b* reads out information on another character string search area, which is different from the character string search area A1 to be used for the ID card 6, from the character string search area storage section 5*c* to set the newly read character string search area over the binary image data saved in the image memory 3.

Next, in Step S21 (a step for checking any residual character string search area), the main controller 50 of the data processor 5 judges whether or not any unused character string search area still remains. If no unused character string search area remains, operation of the flowchart shown in FIG. 4 finishes. Meanwhile, if any unused character string search area remains, operation returns to Step S12 to repeat the steps described above. Incidentally, with regard to an order of operation of Steps S20 and S21, Step 21 may be carried out earlier, and it is also possible to carry out both the steps simultaneously.

By way of carrying out the steps described above, the character string segmenting step is executed in due order with respect to all the character string search areas stored in the character string search area storage section 5*c*. Thus, every one of various card formats assumed can be recognized correctly.

Figure 3:
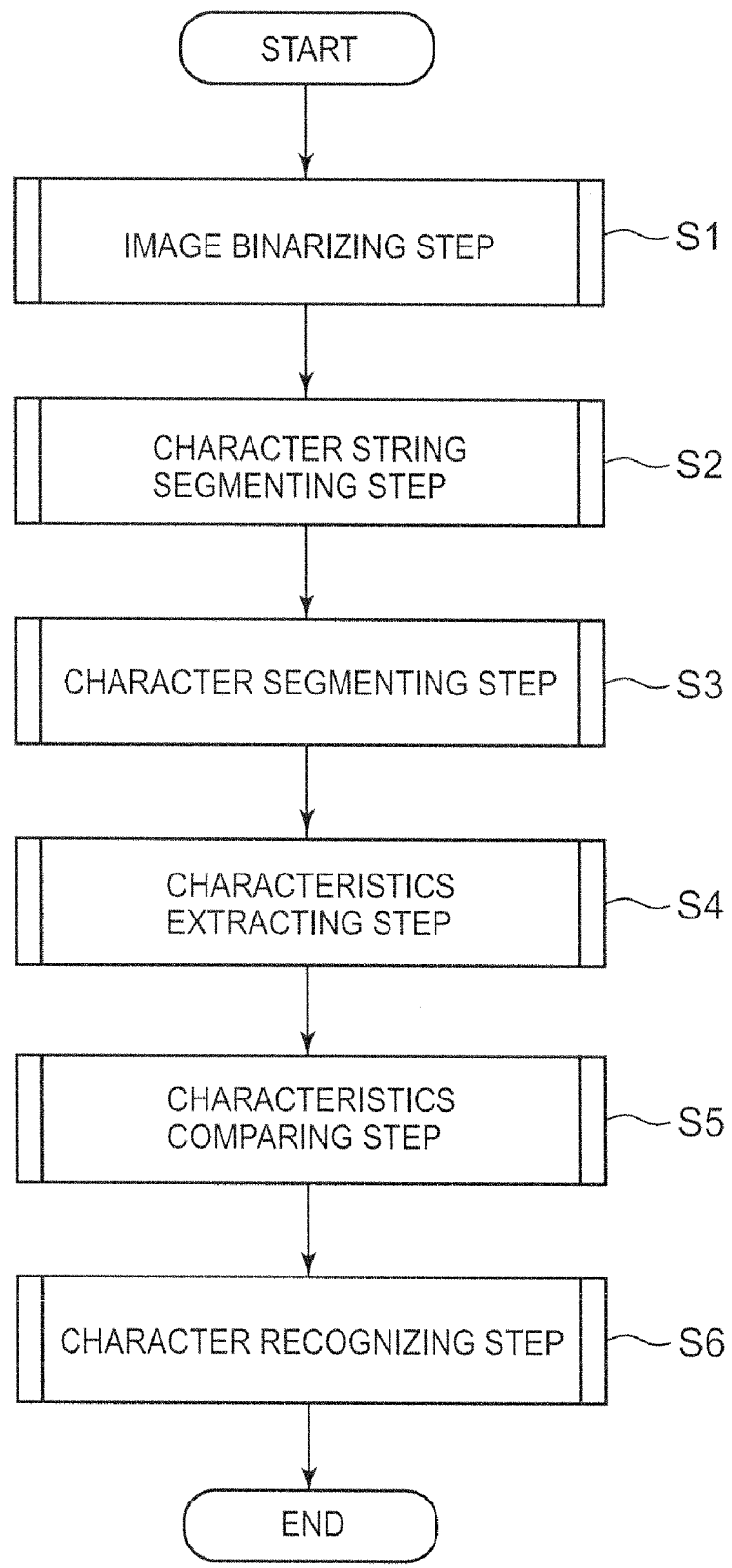
FIG. 3 is a flowchart describing a general operation flow of a character string recognition method in accordance with the first embodiment.

After the flowchart shown in FIG. 4 finishes, operation progresses to Step S3 of the flowchart shown in FIG. 3.

Figure 18:
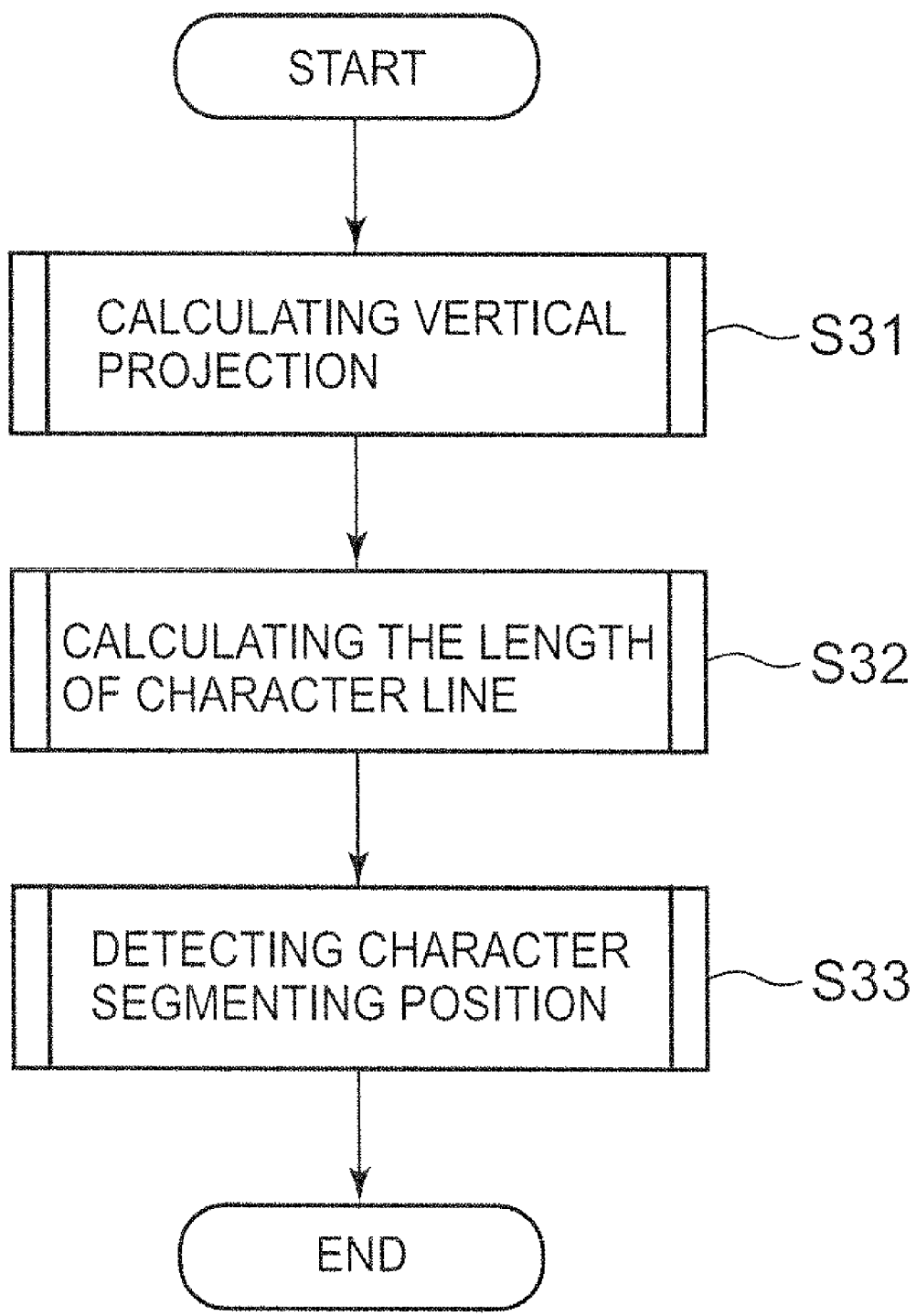
FIG. 18 is a flowchart describing a detailed operation flow of character segmentation in the flowchart shown in FIG. 3.

Character Segmenting Step:

The character segmenting step S3 is explained below according to a flowchart shown in FIG. 18. At first in Step S31, while shifting an objective projecting position in a direction of character strings, the character segmenting section 5*d* calculates a vertical projection in a direction perpendicular to the direction of character strings. Concretely to describe, for one of the character strings (e.g., the upper character string within the image processing area B1 shown in FIG. 6), the number of pixels of binary image data "1" corresponding to black pixels is counted (summed up) in each pixel line perpendicular to the direction of the character string (namely, in a vertical direction) to create a vertical projection histogram.

Next, the character segmenting section 5*d* moves to Step S32 in order to calculate the length of a character line according to the number of pixels between both ends of the character string detected by making use of the vertical projection data obtained through Step S31.

Then, the character segmenting section 5*d* moves to Step S33 in order to detect positions, where the vertical projection data obtained through Step S31 exceeds a predetermined threshold, as segmenting positions of characters constituting the character string. Concretely to describe; since the projection data includes the characters constituting the character string as well as space parts among the characters, character segmenting positions are detected if the threshold is set with a brightness value of the space parts (the binary image data "0" corresponding to white pixels in the case of the first embodiment).

Through the character segmenting step described above, calculated are circumscribing rectangular areas (i.e., coordinate values of an upper end, a lower end, a left end, and a right end for each of the characters objective for character recognition). Then, the flowchart shown in FIG. 18 finishes, and operation progresses to Step S4 of the flowchart shown in FIG. 3.

Characteristics Extracting Step:

After the character segmentation, operation progresses to Step S4 for the characteristics extracting section 5*e* to extract characteristics. Namely, the characteristics extracting section 5*e* divides a circumscribing rectangular area into "n×n" sub areas. For example, in the case of "n=5", 25 sub areas are created. Then, for each sub area, a proportion value of black pixels to all pixels in the sub area is calculated, and a characteristics vector composed of these proportion values as elements is created.

Characteristics Comparing Step

After the characteristics extraction, operation progresses to Step S5 for the characteristics comparing section 5*f* to compare characteristics.

Namely, the characteristics comparing section 5*f* compares the characteristics vector created in Step 4 with the standard characteristics vectors stored in the characteristics dictionary storage section 5*g*, and sets a standard characteristics vector showing a highest degree of similarity (e.g., normalized correlation coefficient) as a candidate character for the objective character.

Character Recognizing Step:

After the characteristics comparison, operation progresses to Step S6 for the character judging section 5*h* to recognize a character.

Namely, the character judging section 5h recognizes the candidate character set in Step S5 as the character used in the medium 6.

If there exist multiple candidate characters having a degree of similarity greater than a certain level, character recognition cannot be carried out at this stage. If so, operation deals with the character as an unidentified character, or carries out recognition for a similar character by making use of secondary characteristics drawn out of the characteristics vector.

For example, an attention is focused on 3 kinds of symmetric properties (e.g., a horizontal line-symmetric property, a vertical line-symmetric property, and a point-symmetric property). For the horizontal line-symmetric property, the "n×n" sub areas are divided into two sections (i.e., a left half section and a right half section), and then a partial characteristics vector is configured to check their similarity. Furthermore, for the vertical line-symmetric property, the "n×n" sub areas are divided into two sections (i.e., a upper half section and a lower half section), and then a partial characteristics vector is configured to check their similarity. Still further, for the point-symmetric property, its similarity is also checked in the same way. Since the 3 kinds of form characteristics amounts are obtained, a corresponding character is related according to relationships of their values.

Sometimes there still remain some cases where a judgment cannot be made. For example, in the case of some types of characters to be used for the medium, it may be difficult to discriminate between "o" (an alphabetical "o") and "0" (a numeric "0"). In such a case, checking differences in the height of the character and the curvature at 4 round corners enables judgment.

After the step described above, the character string recognition method by using the character string recognition apparatus 1 finishes its operation.

Advantageous Effects of the First Embodiment

As described above, according to the first embodiment, each format can be recognized correctly even in a recognition process system in which a plurality of formats of media, such as the ID card 6 and the like, are expected.

Furthermore, the image processing area B1 on a medium, such as the ID card 6 and the like, is divided into a plurality of segments SE in a placement direction of the character strings, and the number of character string lines of the entire area for the image processing area B1 is determined according to the number of character string lines in each of these segments SE. Then, according to the number of character string lines, a validity of the character strings (whether or not the character strings are predetermined character strings) can be verified.

Second Embodiment of the Present Invention

Figure 19:
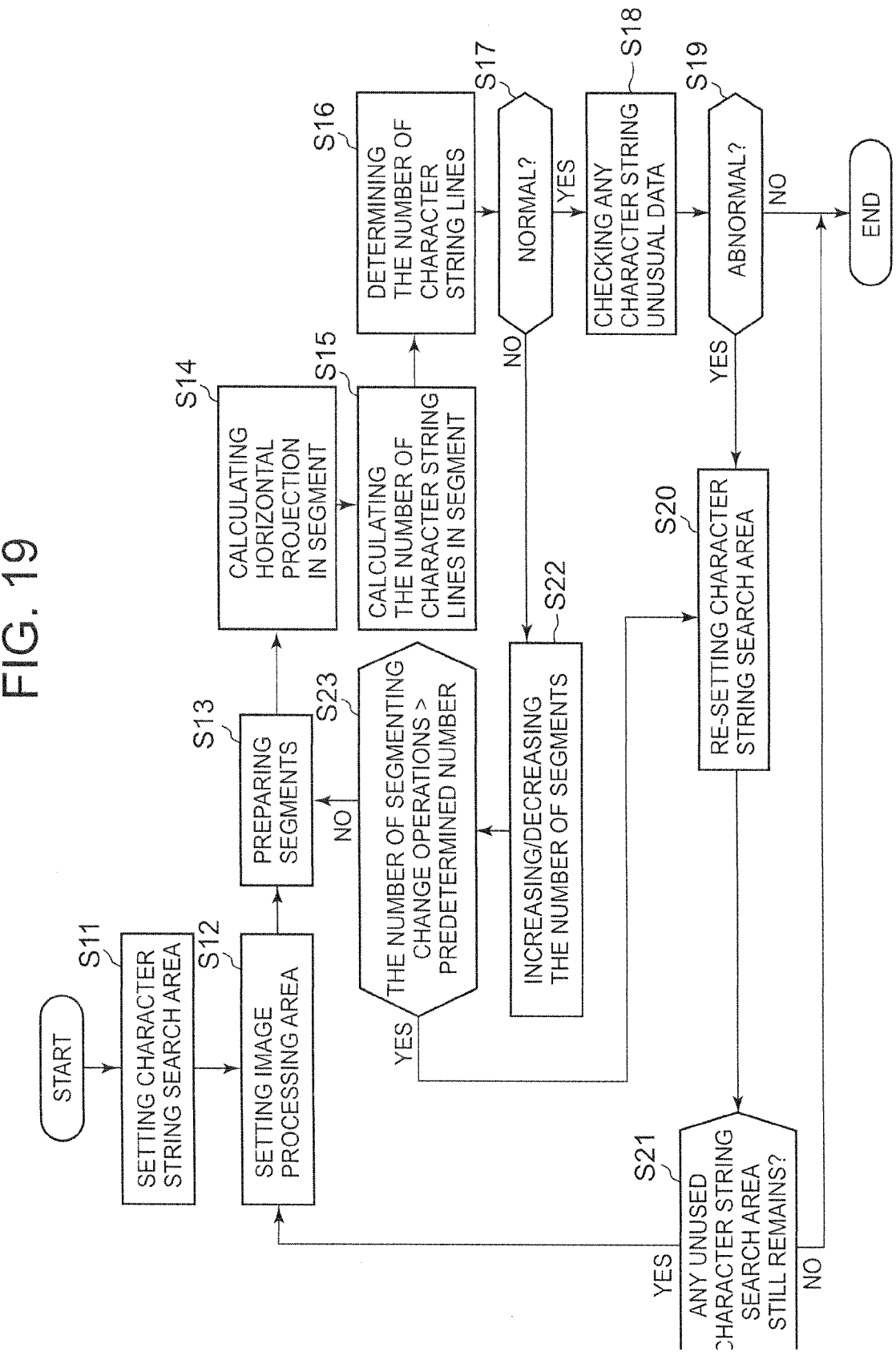
FIG. 19 is a flowchart describing a detailed operation flow of character string segmentation in a flowchart showing a general operation flow of a character string recognition method in accordance with a second embodiment of the present invention.

FIG. 19 represents a second embodiment of the present invention.

Explained in the first embodiment described above is a case where, if it is judged according to the number of character string lines for each prepared segment SE that the frequency distribution on the number of segments showing the predetermined number of character string lines is not normal (i.e., the media 6 is not an ID card 6) as a result of the judgment at Step S17 in the flowchart shown in FIG. 4, a different character string search area is set on the medium 6. Alternatively, instead of setting the different character string search area A2, a different type of segments SE may be created for the image processing area B1 in the character string search area A1 initially placed. Explained below is a case where such a different type of segments SE is created.

More specifically, in the second embodiment as shown in FIG. 19, if it is judged according to the number of character string lines for each prepared segment SE that the frequency distribution on the number of segments showing the predetermined number of character string lines is not normal as a result of the judgment at Step S17, the segment preparing section 53 of the character string segmenting section 5b makes a change to increase/decrease the number of segments in the image processing area B1 at Step S22 (a segment re-creating step).

Then, the main controller 50 of the character string segmenting section 5b makes a judgment at Step S23 (a step for judging the number of segmenting change operations) about whether or not the number of operations for increasing/decreasing the number of segments in the image processing area B1 exceeds a predetermined number (for example, 5 times).

As a result, if the number of operations for increasing/decreasing the number of segments in the image processing area B1 does not exceed the predetermined number, operation returns to Step S13. Then, the segment preparing section 53 of the character string segmenting section 5b makes up a plurality of segments SE (for example, 16 segments) by segmenting the image processing area B1 with the number of segments, increased/decreased at Step S22, in a direction of character strings placed on the medium 6.

On the other hand, if the number of operations for increasing/decreasing the number of segments in the image processing area B1 exceeds the predetermined number, it is concluded that, according to the number of character string lines for each prepared segment SE, judging the frequency distribution on the number of segments showing the predetermined number of character string lines to be normal is hardly possible, despite further increasing/decreasing the number of segments in the image processing area B1. Then, operation progresses to Step S20, and the character string search area setting section 51 of the character string segmenting section 5b sets a character string search area A2, which is different from the character string search area A1, over the binary image data saved in the image memory 3. Afterwards, the same operation as the embodiment shown in FIG. 4 is carried out.

According to the steps described above, operation of segmenting the image processing area B1 is repeated for the predetermined number of times so that the format recognition can be executed precisely.

For other processing, the same operation as the first embodiment described above is carried out, and therefore the second embodiment produces the same effects as the first embodiment does.

Other Embodiments of the Present Invention

In the first and second embodiments described above, the character string search area A1 placed according to the format of the ID card 6 is further narrowed so as to set the image processing area (effective area) B1 where the character string segmenting step and its following steps become effective. Alternatively, not having the image processing area B1 intentionally, the character string search area A1 may be used as an image processing area (effective area) for the character string segmenting step and its following steps. In other words, the steps S11 and S12 may be combined as one step.

In the first and second embodiments described above; for checking if the medium is an ID card 6 or not, it is judged by making use of the second-order differences of character string center positions with respect to each of the segments SE, whether or not the character string(s) placed on the medium is the predetermined character string(s). However, it is not necessarily needed to adopt a character string center position as a character string position showing a position of the character string in the direction perpendicular to the direction of the character string. Alternatively, for example, one of the trisected positions defined with (LT+2LB)/3 may be used as a character string position. Furthermore, instead of the method using second-order differences, the multivariate analysis, such as the regression analysis, the principle component analysis, and so on may be applied as well.

In the first and second embodiments described above; used is the data input section 2 composed of a combination of the medium transfer mechanism 2a and the one-dimensional imaging element 2b. Alternatively, for example, the data input section 2 may be composed of a combination of an area sensor, such as 2-dimensional CCD, a CMOS imager, etc., and a photographic subject support mechanism.

The character string recognition apparatus 1 in the first and second embodiments described above includes the medium transfer mechanism 2a. Alternatively, a character string recognition apparatus of a manual operation type may be used, the character string recognition apparatus transferring the medium along a guiding surface such as the transfer guide 2c manually, without the medium transfer mechanism 2a.

The character string recognition apparatus 1 for the ID card 6 is explained in the first and second embodiments described above. Needless to describe, alternatively the present invention may be applied to a character string recognition apparatus for recognizing a character string recorded in any medium other than the ID card 6 (for example, a passport, a check, a credit card, a debit card, digital cash, a driver license, a health insurance ID card, a pension book, a company ID card, a membership card, a library checkout card, and the like).

INDUSTRIAL APPLICABILITY

The character string recognition apparatus and the character string recognition method according to the present invention are suitably applied to recognition of a character string recorded in various kinds of media, such as an ID card, a passport, a check and the like.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1 Character string recognition apparatus
2 Data input section
2a Medium transfer mechanism
2b One-dimensional imaging element
3 Image memory
5 Data processor
5a Image binarizing section
5b Character string segmenting section
5c Character string search area storage section
5d Character segmenting section
5e Characteristics extracting section
5f Characteristics comparing section
5g Characteristics dictionary storage section
5h Character judging section
6 ID card as a medium
50 Main controller
51 Character string search area setting section (Means for setting character string search areas)
52 Image processing area setting section (Means for setting image processing areas)
53 Segment preparing section (Means for preparing segments)
54 Projection calculating section (Means for calculating projection)
55 Section for calculating the number of character string lines (Means for calculating the number of character string lines)
56 Section for determining the number of character string lines (Means for determining the number of character string lines)
57 Section for judging the number of character string lines
58 Difference calculating section
59 Character string validity check section (Means for checking character string validity)
"A" Character string search area
"B" Image processing area
"SE" Segment

What is claimed is:

1. A character string recognition apparatus, for recognizing a character string through processing image data obtained by imaging the character string placed on a medium, comprising:
   means for setting a first character string search area on the medium;
   means for preparing segments for making up a first plurality of segments by segmenting the character string search area in a direction of the character string;
   means for calculating projection for calculating a projection of the image data in direction of the character string for each of the first segments;
   means for calculating a number of character string lines for each of the first segments according to the projection of the image data;
   means for determining the number of character string lines in the character string search area as a whole according to the number of character string lines in each of the first segments; and
   means for checking the character string validity for verifying whether or not the character string is a predetermined character string, according to the number of character string lines in the character string search area as a whole.

2. The character string recognition apparatus according to claim 1;
   wherein the means for determining the number of character string lines creates a frequency distribution on the number of first segments showing a predetermined number of character string lines according to data of the number of character string lines in each of the first segments, and determines the number of character string lines in the character string search area as a whole, with the number of character string lines having a maximum frequency.

3. The character string recognition apparatus according to claim 2;
   wherein the means for setting a character string search area sets a second character string search area, being different from the first character string search area, over the medium if the frequency distribution on the number of first segments showing the predetermined number of character string lines is not normal.

4. The character string recognition apparatus according to claim 2;
wherein the means for preparing segments increases or decreases the number of segments for the character string search area to make up a second type of segments, being different from the first segments, if the frequency distribution on the number of first segments showing the predetermined number of character string lines is not normal.

5. The character string recognition apparatus according to claim 1;
wherein the means for checking the character string validity calculates character string positions in a direction perpendicular to the direction of the character string for each of the first segments, and checks the presence of unusual data in the character strings according to first-order differences of positions of the character string, and then judges that the character strings are predetermined character strings if no unusual data is detected in the character strings.

6. The character string recognition apparatus according to claim 5;
wherein the means for setting a character string search area sets a second character string search area, being different from the first character string search area, over the medium if unusual data is detected in the character strings.

7. The character string recognition apparatus according to claim 5;
wherein, at the time of checking the presence of unusual data in the character strings, the means for checking the character string validity judges that unusual data exists in the character strings if a maximum absolute value of second-order differences of character string positions with respect to each of the first segments exceeds a predetermined threshold.

8. The character string recognition apparatus according to claim 5;
wherein the character string positions are character string center positions.

9. The character string recognition apparatus according to claim 1;
wherein the number of first segments to be made up is n-th power of 2, where "n" is a positive integer.

10. A character string recognition method, for recognizing a character string through processing image data obtained by imaging the character string placed on a medium, comprising:
a character string search area setting step for setting the character string search area on the medium;
a segment preparing step for making up a plurality of segments by segmenting the character string search area in a direction of the character string;
a projection calculating step for calculating the projection of the image data in direction of the character string for each of the segments;
a character string line calculating step for calculating the number of character string lines for each of the segments according to the projection of the image data;
a step number of character string lines determining step for determining the number of character string lines in the character string search area as a whole according to the number of character string lines in each of the segments; and
a step character string validity checking step for verifying whether or not the character string is a predetermined character string, according to the number of character string lines in the character string search area as a whole.

* * * * *